US008316746B2

(12) United States Patent
Hediger et al.

(10) Patent No.: US 8,316,746 B2
(45) Date of Patent: Nov. 27, 2012

(54) METHOD AND DEVICE FOR TRIMMING PRINT PRODUCTS

(75) Inventors: Hanspeter Hediger, Sempach Stadt (CH); Daniel Rölli, Nebikon (CH)

(73) Assignee: Mueller Martini Holding AG, Hergiswil (CH)

( * ) Notice: Subject to any disclaimer, the term of this patent is extended or adjusted under 35 U.S.C. 154(b) by 748 days.

(21) Appl. No.: 11/591,456

(22) Filed: Nov. 2, 2006

(65) Prior Publication Data

US 2007/0095182 A1 May 3, 2007

(30) Foreign Application Priority Data

Nov. 2, 2005 (EP) .................................... 05405618

(51) Int. Cl.
*B23Q 15/00* (2006.01)
*B26D 7/02* (2006.01)

(52) U.S. Cl. .................. 83/72; 83/451; 83/452; 83/457; 83/466

(58) Field of Classification Search .................... 83/624, 83/457, 385, 72, 76.9, 466, 462, 934, 451, 83/452
See application file for complete search history.

(56) References Cited

U.S. PATENT DOCUMENTS

| | | | | |
|---|---|---|---|---|
| 2,482,685 | A * | 9/1949 | Moyer | 83/255 |
| 3,074,304 | A * | 1/1963 | Coie | 83/456 |
| 3,146,650 | A | 9/1964 | Sarring et al. | |
| 3,182,542 | A | 5/1965 | Cochran | |
| 3,732,766 | A | 5/1973 | McCain et al. | |
| 3,898,903 | A | 8/1975 | Bulka et al. | |
| 4,505,173 | A * | 3/1985 | Hartlage | 83/112 |
| 5,114,394 | A * | 5/1992 | Madsen | 493/227 |
| 6,484,615 | B2 * | 11/2002 | Lindee | 83/596 |
| 6,520,058 | B2 * | 2/2003 | Nakajima et al. | 83/206 |
| 7,077,042 | B2 * | 7/2006 | Nogawa et al. | 83/466 |
| 2001/0037708 | A1 * | 11/2001 | Matthes et al. | 83/13 |
| 2002/0148339 | A1 * | 10/2002 | Zechini | 83/646 |
| 2003/0079584 | A1 | 5/2003 | Cote et al. | |
| 2006/0081100 | A1 * | 4/2006 | Fassbind | 83/13 |
| 2007/0044616 | A1 | 3/2007 | Matthes | |

FOREIGN PATENT DOCUMENTS

| | | |
|---|---|---|
| EP | 1 201 379 A2 | 5/2002 |
| EP | 1 759 820 | 3/2007 |

OTHER PUBLICATIONS

European Search Report.

* cited by examiner

*Primary Examiner* — Boyer D Ashley
*Assistant Examiner* — Omar Flores Sanchez
(74) *Attorney, Agent, or Firm* — Venable LLP; Robert Kinberg; Steven J. Schwarz

(57) ABSTRACT

A trimming apparatus comprises a conveying device, a movable upper knife, an immovable lower knife, a movable press crosshead, a first drive, and a control unit. The print product is pressed down with the press crosshead. The pressed down print product is trimmed with the upper and lower knives. The press crosshead is lifted following the step of trimming operation. Subsequent to lifting the press crosshead, the upper knife is lifted. The trimmed print product is conveyed with the conveying device.

4 Claims, 3 Drawing Sheets

METHOD AND DEVICE FOR TRIMMING PRINT PRODUCTS

CROSS-REFERENCE TO RELATED APPLICATION

This application claims the priority of European Patent Application No. 05405618.9-2301, filed on Nov. 2, 2005, the subject matter of which is incorporated herein by reference in its entirety.

BACKGROUND

The invention relates to a method for trimming print products in a trimming apparatus, the apparatus comprising at least one upper knife, one immovable lower knife, one movable press crosshead, a drive, and a control unit. Prior to the trimming operation, the print product is pressed down by the press crosshead. Following the trimming operation, the upper knife and the press crosshead are lifted up and the trimmed product is conveyed further with a conveying device. The invention furthermore relates to a trimming apparatus for realizing the above-described method.

Methods of the aforementioned type are used in particular in the print-processing industry, for example, for trimming stitched paper signatures along three open edges. The trimming apparatus is coordinated with a conveying device for conveying the print products from a first to a second trimming station. The print product is trimmed along one fore-edge in the first trimming station, in a direction transverse to the conveying direction. Following the fore-edge trimming, the print product is supplied by the conveying device to the second trimming station in which the top and bottom edges are trimmed simultaneously. The print product, which is trimmed on three sides, is then conveyed away from the trimming apparatus by the conveying device.

The two trimming stations operate simultaneously by trimming the fore-edge of a first print product and, simultaneously, trimming the top and bottom edges of a second print product. The first trimming station is provided with a movable upper knife, an immovable lower knife, and a press crosshead, also called a press guide or ruler. The second trimming station is provided with two movable upper knives, arranged at a distance to each other on the sides. An immovable lower knife and a press crosshead are assigned to each upper knife, wherein the press crosshead is connected to the upper knife. The press crosshead moves ahead of the respective knife before the start of the trimming operation, so that the print products are pressed down at the start of the trimming operation. Following the trimming operation, the press crosshead is driven to lag behind the upper knife. The print product can be conveyed further once the press crosshead, which is driven to lag behind the upper knife, is lifted off the print product.

Trimming apparatuses of this type increasingly have to meet narrower trimming tolerances with simultaneously higher production capacities. More precise and faster reacting transport and control systems are correspondingly needed for the intermittent transport and/or the movement for advancing the print products in the trimming apparatus. The presently available drive systems for advancing products, used in known methods and apparatuses, meet these requirements only up to a specific cycle number and/or production capacity.

SUMMARY

It is therefore an object of the present invention to provide a method and a trimming apparatus for realizing this method, which permit a higher production capacity while still ensuring a safe operation.

The above and other objects are accomplished according to the invention, which in one embodiment comprises: a method for trimming print products in a trimming apparatus, the apparatus comprising a conveying device, a movable upper knife, an immovable lower knife, a movable press crosshead, a first drive, and a control unit, the method comprising: pressing down the print product with the press crosshead; trimming the pressed down print product with the upper and lower knives; lifting the press crosshead following the step of trimming operation; subsequent to lifting the press crosshead, lifting the upper knife; and conveying the trimmed print product with the conveying device.

As a result, the trimmed print product is released much earlier after the trimming operation than is presently done. After that, the trimmed product is conveyed to a second trimming station. As a result, a considerable share of the time required for the return phase of the knife movement can be used for advancing the print product while the quicker release of the press crosshead can be utilized for an earlier start of the print product-advancing movement. Since more time is available for the transport, a much gentler start for advancing the print product is possible, which is extremely advantageous especially when dealing with thin and delicate print products.

According to another embodiment of the invention, the press crosshead is lifted up just before the upper knife reaches the bottom dead center. A particularly large share of time is therefore available for the advancing operation.

According to a further embodiment of the invention, the press crosshead is raised by a distance that corresponds to the thickness of the print product, thereby making the moment of release independent of the thickness of the print product. The print product is released in cycle with the machine, meaning always at the same machine angle.

The press crosshead according to a different embodiment of the invention is driven with the aid of a motor, wherein this drive is uncoupled from the movement of the upper knife when the press crosshead is lifted up ahead of the upper knife, as mentioned in the above, thereby resulting in a particularly simple and optimum movement course.

The method according to still another embodiment of the invention is realized with a three-knife trimmer, comprising a first trimming station for realizing the cut along the fore-edge and a second trimming station for realizing the cuts along the bottom and top edges, wherein all three press crossheads in this case are lifted up simultaneously and ahead of time.

The trimming apparatus for realizing the method is characterized in that the drive for the press crosshead is uncoupled from the drive for the upper knife. According to a different embodiment of the invention, a motor is advantageously used for driving the press crosshead, preferably a servomotor, wherein the servomotor is preferably arranged outside of the trimming station and/or stations.

According to yet another embodiment of the invention, the trimming apparatus is a three-knife trimmer with a first trimming station for realizing a fore-edge cut and a second trimming station for realizing a top and bottom cut. It is advantageous if all three press crossheads are driven by a single motor, in particular a servomotor, wherein the servomotor is preferably positioned immovably outside of the two trimming stations.

According to still another embodiment, of the invention is provided with a gear mechanism, in particular a coupling mechanism, which is advantageously positioned on a yoke for the trimming apparatus. In order to execute the movement of lifting up of the press crosshead before the upper knife, the gear mechanism connects the press crosshead to a drive which is uncoupled from the trimming operation. The coupling mechanism is advantageously designed such that it connects the motor to all three press crossheads, wherein a single motor is preferably also used for driving the press crossheads, in particular a servomotor.

BRIEF DESCRIPTION OF THE DRAWINGS

These and other features and advantages of the invention will be further understood from the following detailed description of the preferred embodiments with reference to the accompanying drawings, which show in.

DETAILED DESCRIPTION

Figure 1:
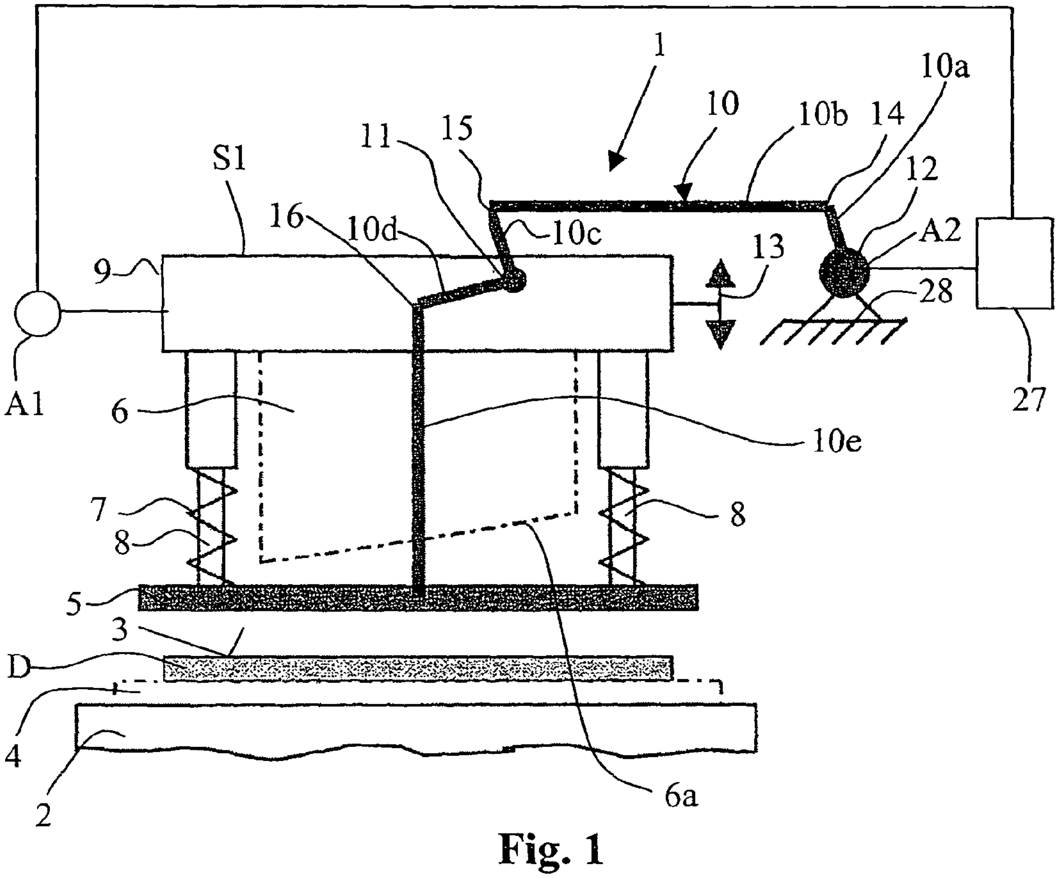
FIG. 1 is a schematic view of a trimming apparatus.
Figure 3:
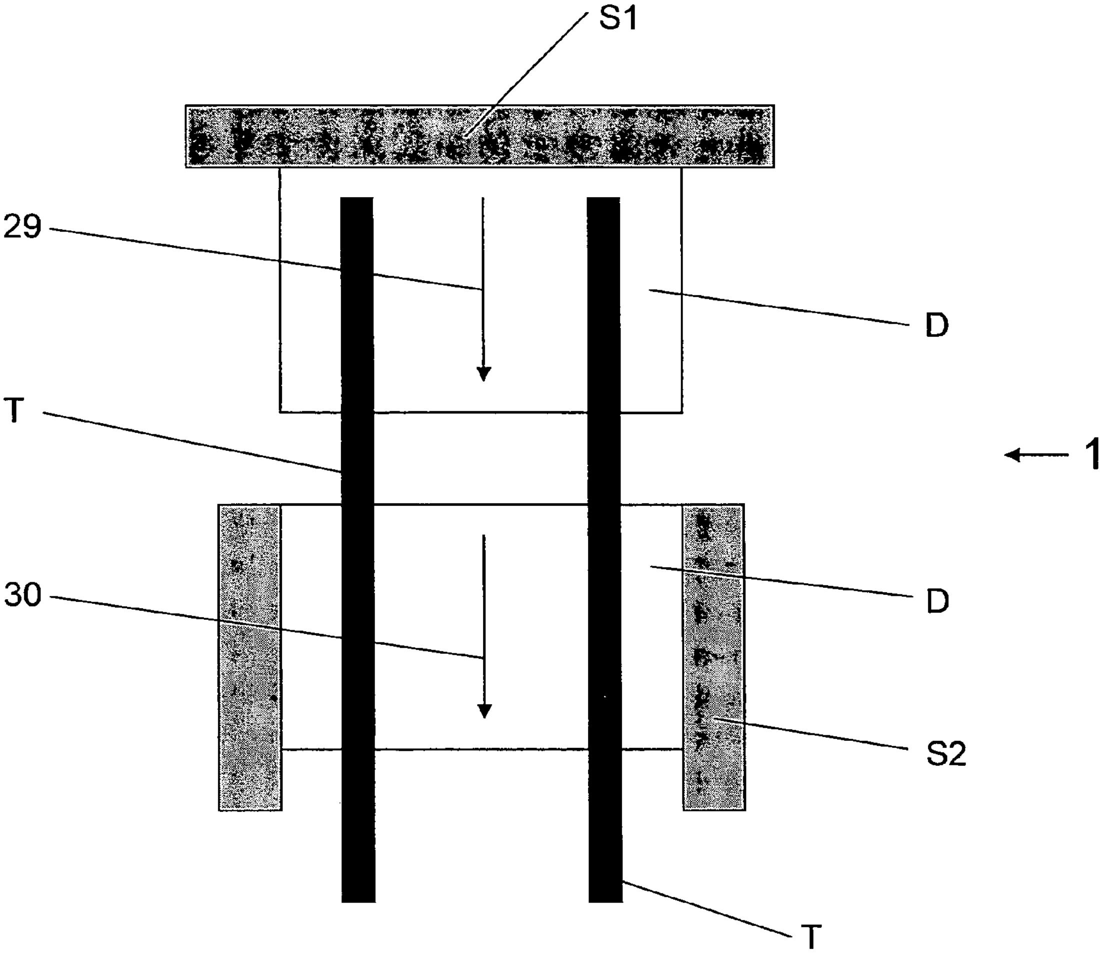
FIG. 3 is a schematic top view of the trimming apparatus.

With reference to FIGS. 1 and 3, the trimming apparatus 1 comprises a first trimming station S1 to which print products D are supplied intermittently with a conveying device T, for example a conveyor belt, in the direction of an arrow 29. The first trimming station S1 functions to execute a fore-edge cut along an open edge. The print product D in this case can be a stitched signature for producing a booklet or the like. Once the fore-edge has been trimmed, the print product D is supplied to a second trimming station S2 with the aid of the conveying device T and in the direction of an arrow 30. At the trimming station S2, the print product D is trimmed simultaneously along the top and bottom edges. The print product D is conveyed controlled from the first trimming station S1 to the second trimming station S2 with the the conveying device T. The trimming apparatus 1 in this case comprises a machine frame 2 to which the trimming stations S1 and S2 are attached.

The trimming apparatus is attached to a vertically movable yoke 9. The yoke 9 is driven with a first drive A1, which is for example provided with shafts and tie rods (not shown). Drives of this type are known. A control unit 27 is used to control the drives.

The upper knife 6 is provided with an angled cutting edge 6*a*. The cutting edge 6*a* cooperates with a fixed lower knife 4 for realizing the trimming operation. The movements of the yoke 9 and/or the upper knife 6 are indicated with a double arrow 13. For the trimming operation, the upper knife 6 is moved from the top toward the bottom against a horizontally positioned top 3 of the print product D. Following the trimming operation and once the upper knife 6 reaches a bottom or lower dead center region 40 (best seen in FIG. 2*c*), the upper knife 6 moves upward again until it reaches a top dead center region 42 (best seen in FIGS. 2*a* and 2*c*). These movements occur synchronized with the movement of the conveying device T.

A press crosshead 5 is positioned with guides 8 on the yoke 9. The press crosshead 5 is used to press down the print product D with the aid of springs 7, for example, which are installed with pre-stressing between the yoke 9 and the press crosshead 5. If the first drive A1 moves the yoke 9 in downward direction, the press crosshead 5 also moves downward until the press crosshead 5 reaches the top 3 of the print product D. Thus, the press crosshead 5 moves ahead relative to the upper knife 6. During the further movement of the yoke 9, the springs 7 are additionally tensioned and the press crosshead 5 is correspondingly pressed against the print product D. The upper knife 6, which follows the press crosshead 5, reaches the print product D and trims the print product D with the cutting edge 6*a*. The print product D is thus pressed down during a first step of trimming operation and is trimmed while pressed down during a second step of the trimming operation. The same steps as used in the first trimming station S1 are also realized with the upper knives and press crossheads of the second trimming station S2, wherein the control unit 27 also controls the second trimming station S2.

Once the print product is trimmed with the trimming apparatus, a second drive A2 lifts up the press crosshead 5 ahead of time and uncoupled from the movement of the yoke 9. As shown in FIG. 1, the second drive A2 is controlled by the control unit 27 and is connected via a gear mechanism 10 to the press crosshead 5. The second drive A2 is provided with a motor 12 that is positioned on a bearing block 28. The bearing block 28 is located outside of and/or to the side of the trimming apparatus 1. In one embodiment, the motor 12 is a servomotor. The gear mechanism 10, for example, is a coupling mechanism, positioned with a bearing 11 on the yoke 9. The gear mechanism 10 comprises a first lever 10*a*, which is connected to the rotor of the motor 12. The first lever 10*a* is connected via a first joint 14 to a connecting rod 10*b* which, in turn, is connected by a second joint 15 to a second lever 10*c*. The second lever 10*c* is fixedly connected via the bearing 11 to a third lever 10*d*. The third lever 10*d* is connected via a third joint 16 and a connecting rod 10*e* to the press crosshead 5. Depending on the rotational direction of motor 12, the press crosshead 5 in FIG. 1 is moved upward or downward with the aid of the gear mechanism 10. The gear mechanism 10 can also be designed to be positioned with two or more bearings 11 on the yoke 9.

The trimming operation is explained in further detail below, with particular reference to FIGS. 2*a*, 2*b*, 2*c* and 2*d*.

Figure 2A:
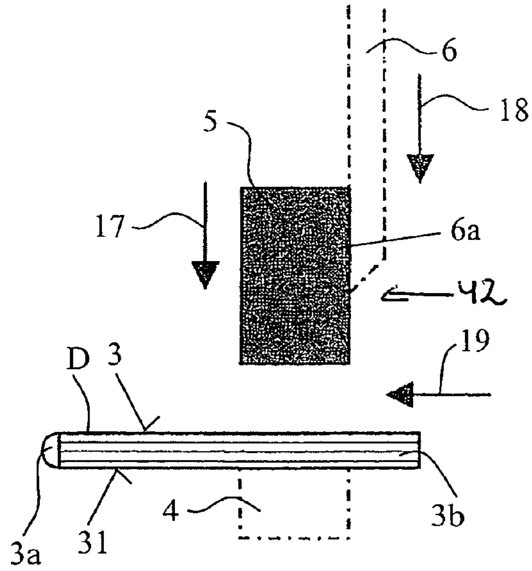
FIGS. 2*a*-2*d* schematically show the individual steps executed in the trimming apparatus, in particular the movements of the upper knife and the press crosshead.
Figure 2B:
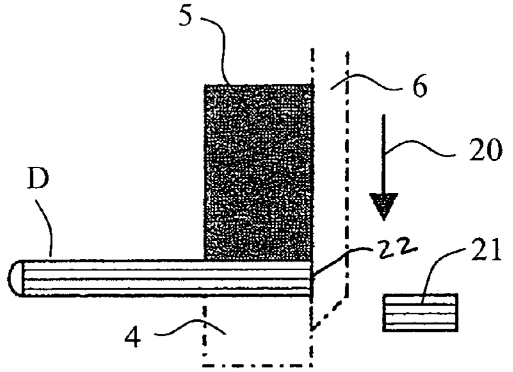

FIG. 2*a* shows the starting condition in which the yoke 9 is positioned in a top dead center and the press crosshead 5 is also in an upper position. The print product D is positioned ready for the trimming operation, with an underside 31 resting flat on the lower knife 4. A back 3*a* of the print product D extends parallel to the trimming plane for the upper knife 6. The print product D is supplied in the direction of the arrow 19. To make the cut, the upper knife 6 and the press crosshead 5 are simultaneously moved downward with the yoke 9, in the direction of arrows 17 and/or 18. As explained above, the print product D is first pressed down with the press crosshead 5, as shown in FIG. 2*b*, and is subsequently trimmed with the upper knife 6 which moves further downward as indicated by an arrow 20. A section 21 is completely trimmed off the print product D along a trimming surface 22 and is removed, for example, suctioned off.

Figure 2C:
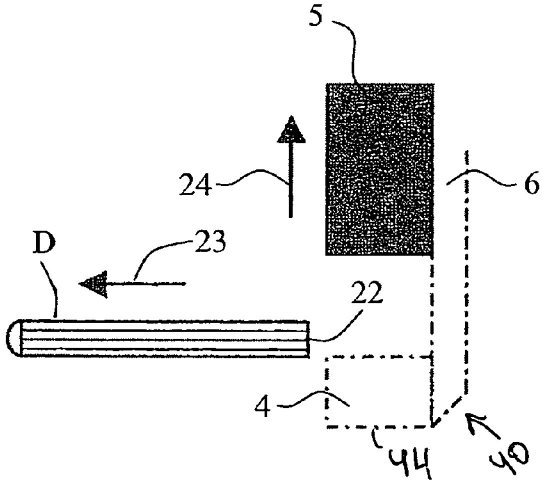
Figure 2D:
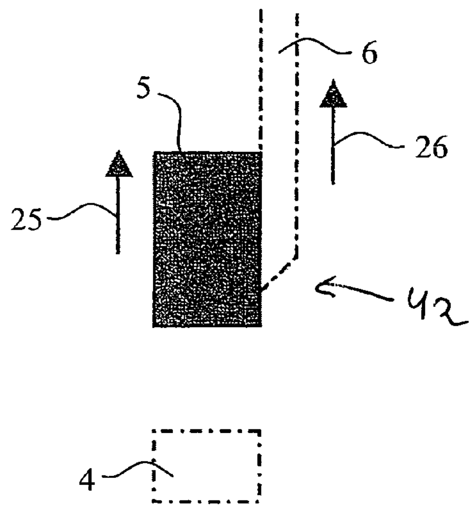

The upper knife 6 is moved to the lower dead center region 40, shown in FIG. 2*c*, in which the cutting edge 6*a* reaches approximately a lower edge 44 of the lower knife 4. In the dead center region 40, the press crosshead 5 is immediately moved upward again, as shown with an arrow 24. As a result, the print product D is released and is then conveyed further in the direction of an arrow 23. The second drive A2, which is uncoupled from the movement of the yoke 9, moves the press crosshead 5 in the direction of an arrow 24. According to FIG. 1, the motor 12 is driven to move in clockwise direction. The connecting rod 10*b* therefore moves to the right and the connecting rod 10*e* moves upward with the press crosshead 5. The operating range for the movement to release the press crosshead 5 is controlled by the control unit 27, with the aid of the motor 12, so that the lift-up moment does not depend on the thickness of the print product D. The moment of releasing the print product D thus no longer depends on the thickness of the print product D and always occurs at the same instance and/or machine angle. Once the press crosshead 5 is lifted up, the press crosshead 5 moves further upward as shown with an arrow 25 in FIG. 2*d*, wherein the upward movement of the yoke 9 catches up with the press crosshead 5 in the top dead center region 42. The upper knife 6 and the press crosshead 5 are both again positioned in the top dead center region 42 so that the cutting edge 6*a* is disposed about a middle section of the press crosshead 5.

The springs 7 are further tensioned and/or compressed during the aforementioned lifting movement of the press crosshead 5.

The leading movement of the press crosshead 5 leaves more time for conveying the print product D in the direction of the arrow 23, thus resulting in a more careful transport in that direction, for example by allowing the acceleration to be kept lower than has been possible so far.

The movements illustrated in FIGS. 2*a* to 2*d* are, for example, executed simultaneously by all three upper knives 6 and press crossheads 5. The gear mechanism 10 in this case is simultaneously connected to all three press crossheads 5 with the aid of gear components (not shown). Two print products D are trimmed simultaneously, wherein a first print product D is trimmed along the fore-edge and a second print product D is trimmed along the top and bottom edges. The first print product D, which is trimmed only along the fore-edge, is subsequently supplied to the second trimming station S2 with the conveying device T. Separate servomotors could also be used to operate the three press crossheads 5, but this would require a considerably higher expenditure than having the aforementioned joint drive, connected via the gear mechanism 10. The trimming apparatus 1 according to the application is preferably a three-knife trimmer, but can also be the trimming apparatus with only one trimming station.

It will be understood that the above description of the present invention is susceptible to various modifications, changes and adaptations, and the same are intended to be comprehended within the meaning and range of equivalents of the appended claims.

What is claimed is:

1. A trimming apparatus for trimming print products, comprising:
- a first trimming station comprising:
  - a movable press crosshead adapted to press down the print products; and
  - a movable upper knife and a fixed lower knife adapted to trim the print products;
- a first drive adapted to move the movable upper knife in a cutting motion, the first drive further adapted to simultaneously move the movable press crosshead;
- a second drive adapted to move the movable press crosshead in a direction opposite to the cutting motion independently of movement of the movable upper knife;
- a conveying device adapted to convey the print products;
- a control unit adapted to control at least the first drive and the second drive, wherein the control unit operates the second drive to move the movable print crosshead in the direction opposite to the cutting motion before the first drive moves the upper knife in the direction opposite to the cutting motion;
- a gear mechanism including a coupling mechanism, wherein the gear mechanism connects the second drive to the press crosshead; and
- a yoke supporting the movable upper knife, wherein the gear mechanism is arranged on the yoke.

2. The apparatus of claim 1, further comprising:
- a first and second trimming stations comprising a second movable upper knife and a second movable press crosshead;
- wherein the second drive comprises a motor located outside of the second trimming station.

3. The apparatus of claim 1, wherein the first drive is separated from the second drive.

4. A trimming apparatus for trimming print products, comprising:
- a first trimming station comprising:
  - a movable press crosshead adapted to press down the print products; and
  - a movable upper knife and a fixed lower knife adapted to trim the print products;
- a first drive adapted to move the movable upper knife in a cutting motion, the first drive further adapted to simultaneously move the movable press crosshead;
- a second drive adapted to move the movable press crosshead in a direction opposite to the cutting motion independently of movement of the movable upper knife;
- a control unit adapted to control at least the first drive and the second drive;
- a yoke supporting the movable upper knife; and
- a gear mechanism comprising:
  - a first lever arm coupled to the second drive;
  - a second lever arm and a third lever arm rotatably coupled to the yoke, the second lever arm rotatably fixed with respect to the third lever arm;
  - a first connecting rod connecting the first lever arm to the second lever arm; and
  - a second connecting rod connecting the third lever arm to the movable print crosshead.

* * * * *